(12) United States Patent
McGee

(10) Patent No.: US 9,908,059 B2
(45) Date of Patent: Mar. 6, 2018

(54) DESALINATION OR WATER PURIFICATION MEANS, EXTREMELY LOW COST CONSTRUCTION AND OPERATION

(71) Applicant: Michael Henry McGee, Charlotte, NC (US)

(72) Inventor: Michael Henry McGee, Charlotte, NC (US)

( * ) Notice: Subject to any disclaimer, the term of this patent is extended or adjusted under 35 U.S.C. 154(b) by 315 days.

(21) Appl. No.: 14/757,097

(22) Filed: Jul. 22, 2015

(65) Prior Publication Data
US 2016/0136537 A1 May 19, 2016

Related U.S. Application Data

(60) Provisional application No. 61/999,861, filed on Aug. 8, 2014.

(51) Int. Cl.
| B01D 3/00 | (2006.01) |
| B01D 1/00 | (2006.01) |
| C02F 1/14 | (2006.01) |
| B01D 5/00 | (2006.01) |
| C02F 103/08 | (2006.01) |

(52) U.S. Cl.
CPC .......... B01D 1/0035 (2013.01); B01D 5/009 (2013.01); B01D 5/0066 (2013.01); C02F 1/14 (2013.01); C02F 2103/08 (2013.01)

(58) Field of Classification Search
USPC .......... 202/163, 180, 185.1; 203/10, DIG. 1; 159/32, 903
See application file for complete search history.

(56) References Cited

U.S. PATENT DOCUMENTS

| 4,156,645 A * | 5/1979 | Bray ................... | B01D 61/022 210/652 |
| 4,292,136 A * | 9/1981 | Clavier ............... | B01D 5/0066 159/903 |
| 4,383,891 A * | 5/1983 | Clavier ............... | B01D 5/0066 159/903 |
| 5,409,578 A * | 4/1995 | Kaneko .................... | C02F 1/14 159/903 |
| 6,663,750 B1 * | 12/2003 | Coon ................... | B01D 1/0005 126/600 |
| 6,797,124 B2 * | 9/2004 | Ludwig ............... | B01D 5/0066 159/903 |

(Continued)

*Primary Examiner* — Nina Bhat
(74) *Attorney, Agent, or Firm* — Chen-Chi Lin

(57) ABSTRACT

A very low pressure and entirely mechanical sea water desalination device is described, which may be built and operated at a fraction of the current costs for the desalination of sea water. The desalination device is used to purify polluted or otherwise impure water and is a device is easily scaled and can be used in a very small facilities up to the largest facilities for desalinating or purifying water. The device operates with sunlight and ambient heat, and therefore will be very inexpensive to operate in desert and tropical regions; and slightly more expensive to operate in cooler regions, yet still substantially less expensive than the existing systems. The device reduces the cost of potable water made from sea water or other polluted sources to a level which is comparable to or less than the cost of such water received from traditional local fresh-water sources.

14 Claims, 4 Drawing Sheets

(56) References Cited

U.S. PATENT DOCUMENTS

| | | | |
|---|---|---|---|
| 7,726,138 B2* | 6/2010 | Bailey | B01D 5/0009 |
| | | | 62/121 |
| 8,021,557 B2* | 9/2011 | Langenecker | C02F 1/28 |
| | | | 210/748.01 |
| 8,647,509 B2* | 2/2014 | Vora | B01D 61/022 |
| | | | 210/639 |
| 8,709,216 B2* | 4/2014 | Jaeger | B01D 1/0035 |
| | | | 159/47.1 |
| 9,079,119 B2* | 7/2015 | Alsadah | B01D 1/24 |
| 2008/0017498 A1* | 1/2008 | Szynalski | B01D 3/007 |
| | | | 202/167 |
| 2015/0291442 A1* | 10/2015 | Taomoto | C02F 1/043 |
| | | | 203/10 |

* cited by examiner

DESALINATION OR WATER PURIFICATION MEANS, EXTREMELY LOW COST CONSTRUCTION AND OPERATION

CROSS-REFERENCE TO RELATED APPLICATIONS

The present application is an extension to the Provisional Application Ser. No. 61/999,861, filed on Aug. 8, 2014, by Michael McGee, and entitled, "Very low pressure and entirely mechanical seawater desalination plant, which may be built and operated at a fraction of the current costs for the desalination of seawater. The said plant can also be used to purify polluted or otherwise impure water." This entire provisional disclosure is incorporated herein by reference.

STATEMENT REGARDING FEDERALLY SPONSORED R&D

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

BACKGROUND OF THE INVENTION

The invention generally relates to a process for the mass desalination of sea water; and for the mass removal of pollutants and other impurities from fresh water; and smaller local appliances which can do the same.

The elements that distinguish this technology from the prior art are the sole use of direct sunlight as the means of heating the seawater or other polluted water for evaporation, the minimal use of electricity (or solar panels or other converted power) to run the invention, the combination of parts and processes into the present useful configuration, the overall extremely low cost of construction and for the daily operation of the system for mass production of drinking water, and the extreme scalability of the system from family size to commercial or industrial size to city size to large regional water production size.

SUMMARY OF THE INVENTION

The invention when viewed from the side as a single individual object consists of a single somewhat circular shiny "glass tube" which is ten centimeters high more or less at the top, by ten centimeters wide more or less on the sides, and may be anywhere from one meter to twenty meters long; rounder at the top of the circle, straighter at the sides, and with a somewhat triangular shape, which may be glass or some other material, at the bottom of the somewhat circular tube. The whole of the "glass tube" will be slightly tilted, perhaps three or five degrees from the top of the tilt to the bottom. There will be a place for the entry of untreated water at the top of the tilt, and a larger space at the bottom for the scrubbing of the brine and the exit of treated water. See FIG. 2.

Although the invention encompasses only the structure and composition of this individual "glass tube," the strength of the invention is when the invention is reproduced multiple times in one or more arrays at a particular location or locations.

One object of the invention is to mass-produce fresh water from seawater or impure water, and to produce lesser amounts in local uses, in the simplest and most direct manner possible, with the least possible use of powered equipment and with a processing structure which is constructed in the simplest and least inexpensive manner possible. Another object of the invention is to produce original or recycled purified water for families, or ships at sea, or oil and gas production, or other commercial or industrial purposes; using a purpose-sized appliance with little or no use of external power.

The mass desalination plant will look a lot like an extremely large computer chip, where water flows instead of electrons, yet accomplishing one of the highest purposes of technology, as did the computer chip. This plant may be built of, for purposes of illustration, a half million more or less individual units connected together in a gridded flat framework, which could be as large as 250,000 square meters more or less (62 acres) in a square or rectangular array spread out a few meters above the ground, or spread out as a series of grids over a larger space. In an arid climate such a plant could produce approximately 0.75 cubic meters of water or more (200 gallons) per individual sluiceway per day, or about 200,000 cubic meters or more (53 million gallons) of purified water a day. There is no practical upper limit on the size of an array of sluiceways, so a large plant, or a series of linked plants, could undoubtedly produce much more water per day. The cost of this production, including amortized capital costs, would likely be in the range of US $0.05 to $0.20 per cubic meter (2010 prices).

Most desalination and water purification methods have used more and more force and energy, at greater and greater cost. Science in general looks on greater physical forces and the application of greater amounts of external energy as being more useful to accomplish larger and larger tasks. For mass desalination in warmer climates, though, we must abandon the need for force and energy, and use the smallest possible forces, primarily gravity and small engines, in order to accomplish the desired purpose of mass desalination.

A desalination system is provided to convert sea water into potable drinking water at a much lower cost than current methods of desalination. The system will also convert impure inland fresh water into potable drinking water at a low cost; and recycle polluted industrial water such as is produced in fracking or other oil production at the same low cost.

A very small downward tilted individual three-sided sluice channel, see FIG. 1, perhaps 6 centimeters more or less wide and anywhere from three meters to ten meters long, is provided for sea water or polluted water to flow in at the top under zero pressure and down the sluice channel slowly by gravity for a considerable distance at zero pressure while exposed to sunlight (alternatively, supplemented with a very small amount of heat). A moving conveyor belt inside the tilted sluice channel is provided to remove all solid materials and brine on a steady and continuous basis as the water moves from top to bottom by gravity down the narrow channel. A surrounding sealed cover made of glass or another material will concentrate sunlight and collect heated water vapor and condense it into purified water. Individual units are quite small. Thousands, tens of thousands, or hundreds of thousands of individual units, more or less, mounted together will be required to convert mass volumes of sea water or impure water into drinking water. Ten or twenty or two hundred individual units, more or less, mounted together will be required for family or village or city water treatment or recycling.

The list of uses is many. A small array may be built-in on ships at sea, either to supplement the fresh water supply; or as a primary water supply if built in a robust manner. Lifeboats and other ocean rescue means can be equipped with smaller arrays which can provide a continuous supply of fresh water made from sea water. Remote facilities or island facilities may have arrays to provide either backup or primary water supplies. Space vehicles may have small arrays to recycle used water within any manned or unmanned station as needed.

One huge use will be for the mass desalination of seawater. Currently workable processes for converting raw sea water into potable drinking water are complex and cumbersome; the facilities are very expensive to build and very expensive to operate. As a result, there are very few such facilities worldwide for such conversion. None of these existing desalination facilities is able to produce potable drinking water at a cost which is anywhere near comparable to the normal cost of processing fresh water into potable drinking water. The described invention may be used in order to provide almost infinitely scalable inexpensive facilities for mass desalination or purification to potable fresh water for human consumption and agricultural use, and for recycling used water.

Also, in most of the Third World regions of the world, there is simply no method available for the inexpensive production of pure drinking water from the polluted, impure and disease infested fresh water which is available. The described invention may be used in order to provide almost infinitely scalable facilities for the purification of impure fresh water into clean potable water for human consumption (and for some agricultural uses).

Arrays of small numbers of individual units can also be installed, with a manual power backup to the electric motors, on the roofs or beside houses and buildings in any area of the world to purify water or recycle used water in the event of a catastrophic event or after a hurricane, flood, earthquake or other natural disaster, or in the event of the failure of local water supplies. Such an individual house may use a less efficient device even in cooler climates, which will consist of, say, two or twenty of the tilted sluiceways, producing, say, 0.25 to 0.50 cubic meters of water or less per day from each sluiceway. The size of each such unit array may be about 1-2 meters wide and 2-4 meters long, standing about 2 meters off the ground on its supporting framework. The system may be pumped and kept in motion by a gas or electric motor, and it may have manual wind-up springs such as on an old clock, which can be wound up at the beginning of each day.

Worldwide there are tremendous geographical desert areas and other arid regions, including Saudi Arabia, Israel, Iran and the greatest part of the Middle East, which are experiencing a substantial growth in population, and the traditional sources of water in these desert and arid areas are drying up along with their water tables. Some of these arid yet prosperous nations have been forced to spend as much as billions to pay for desalination plants and to subsidize the cost of the potable water so produced.

In other arid nations with smaller economic bases the expanding populations suffer daily as each such nation, region and individual struggles to find new sources of natural drinking water, since they cannot afford the extremely high cost of building and operating desalination facilities.

Another concern related to population pressure and global warming is the depletion of water tables. The cost of replenishing these water tables is entirely prohibitive due to the large volumes of fresh water which would be required to be added to an aquifer in order to improve currently inadequate underground supplies.

The current drought condition in California and other parts of the United States is due for the most part to an increase in population, coupled with global warming and the resulting changed weather patterns. These changed conditions have substantially decreased the availability of fresh water and as a result people are forced to use less water, farm productivity has declined, and the dryness has generated massive forest fires. The same conditions have exposed great regions of the United States to catastrophic reductions in the amount of water in rivers and lakes and in water tables, all of which have always been counted on to supply drinking and agricultural and industrial water. And even with the wealth of the United States there has been up to now no affordable way to reverse these conditions and either increase or restore normal fresh water supplies.

So even in the United States, the very simplicity of the design of the invention leads to an exceptionally low cost for facility construction and a similarly exceptional low cost per unit of water for the operation of the facility. The extreme scalability of the system means that a system can be built either to provide water for a family, a city, or a whole region; or to provide water to restore a lake or even an aquifer. Treated water may be pumped by pipeline from ocean shore areas to inland areas where it may be needed.

An array of devices may also be used to treat water which has been used in oil production or in Fracking. An array of for example 20,000 or fewer devices could treat all fracking water in an area, with an end product of either fully potable water or water suitable for recycling. If the untreated water from fracking or oil production contains volatile organic compounds (VOC's) it may be necessary to use an evaporation pool before treatment, or give the water a second treatment after the first in a different array if it is to be used as potable water; since it is well known that VOC's evaporate much the same way as water does.

The system here described consists of a single small unit operating at no pressure and with no heating elements; or with minimal heating elements to supplement the process or to operate the plants at night or in somewhat less warm climates. This small single unit will be repeated in an array of ten, or a hundred, or a hundred thousand, or a million, individual units side by side or in rows or in another localized configuration, possibly yet not necessarily with the array having some ability to rotate or otherwise move about to face the sun; with each of the arrayed individual units contributing purified water ultimately to a central collection tank or directly into pipes for distribution.

One use consists of a shaped array of many individual units built side by side in a circular or rectangular manner similar to a radar antenna or a radio telescope antenna, typically resembling a large or small parabolic ("dish") antenna mounted securely on a broad concrete or metallic (or other suitable materials) post which contains the mechanical and flow parts of the array and a rotation mechanism to align the array as much as possible in the direction of the sun. Such an antenna-like array of individual units will produce a considerable volume of purified water with a very small footprint, or using a hundred or more of the arrays in which the only contact with the environment will be the concrete posts; and will be suitable for use in congested areas, or with the post mounted in the ocean just away from shore to preserve coastal areas from the destruction of sea life or from excess disruption of the shoreline.

There will be a great temptation to build the entire tilted sluiceway apparatus except for load points out of plastic or other chemically produced materials, collectively "plastic-like materials." It is true that the structural supports externally holding together a flat or the shaped array of tilted sluiceways may be made either of plastic or metal depending on the desired use and life-span. These structural supporting members, though, should at no time come in contact with the evaporative product or the drinking water.

The use of plastic-like materials in or on the tilted sluiceway or the dome, or in any way which comes in contact with either the evaporative product or the drinking water, MUST BE DONE ONLY WITH EXTREME CAUTION. Many plastic-like materials leach out or transfer into liquids, or otherwise release into liquids, toxic or carcinogenic compounds, and especially in a heated environment such as inside the tilted sluice tubes. IT WILL BE EXTREMELY DESTRUCTIVE TO USERS OF THE PURIFIED WATER if there remains in the finished product even the smallest residue of toxic or carcinogenic compounds leached or released from plastic-like or chemically produced materials during the purification process. Since these tilted sluiceways may last for many years, the standard must be that the materials used are non-reactive and free from any leaching, or other transfer from the materials to the evaporative product or the purified water. THERE MUST BE NO LEACHING WHATSOEVER OF TOXINS FROM ANY MATERIAL WHICH IS USED IN CONTACT WITH THE FEED WATER, THE EVAPORATIVE PRODUCT OR THE CLEAN WATER. This concern applies also to the tubes used to move seawater or polluted water from its source into the top of the tilted sluiceway, and the means used to move purified water away from the tilted sluiceway.

REFERENCES CITED

U.S. Patent Documents

| | | |
|---|---|---|
| 4,156,645 | May, 1979 | Bray |
| 2008/0017498 | January, 2008 | Szynalski |
| 8,647,509 | June, 2010 | Vora et al. |
| 8,021,557 | September, 2011 | Langenecker et al. |
| 9,079,119 | July, 2015 | Alsadah |

Foreign Patent Documents

| | | |
|---|---|---|
| CN2561780 Y | August 2002 | CN |
| WO/2004/074187 | September 2004 | WIPO |
| WO/2001/096243 | September 2000 | WIPO |
| CN100374377 C | May 2006 | CN |
| CN1850645 A | May 2006 | CN |
| EP1921281 | October 2007 | EP |
| WO/2009/058099 | October 2008 | WIPO |
| CN103102031 A | November 2011 | CN |

While the invention will be described in connection with the preferred embodiments shown herein, it will be understood that it is not intended to limit the invention to those embodiments or materials. On the contrary, it is intended to cover all alternatives, modifications, and equivalents, as may be included within the spirit and scope of the invention as described throughout this patent application.

DETAILED DESCRIPTION OF THE INVENTION

Step One: The Sluice

Figure 1:
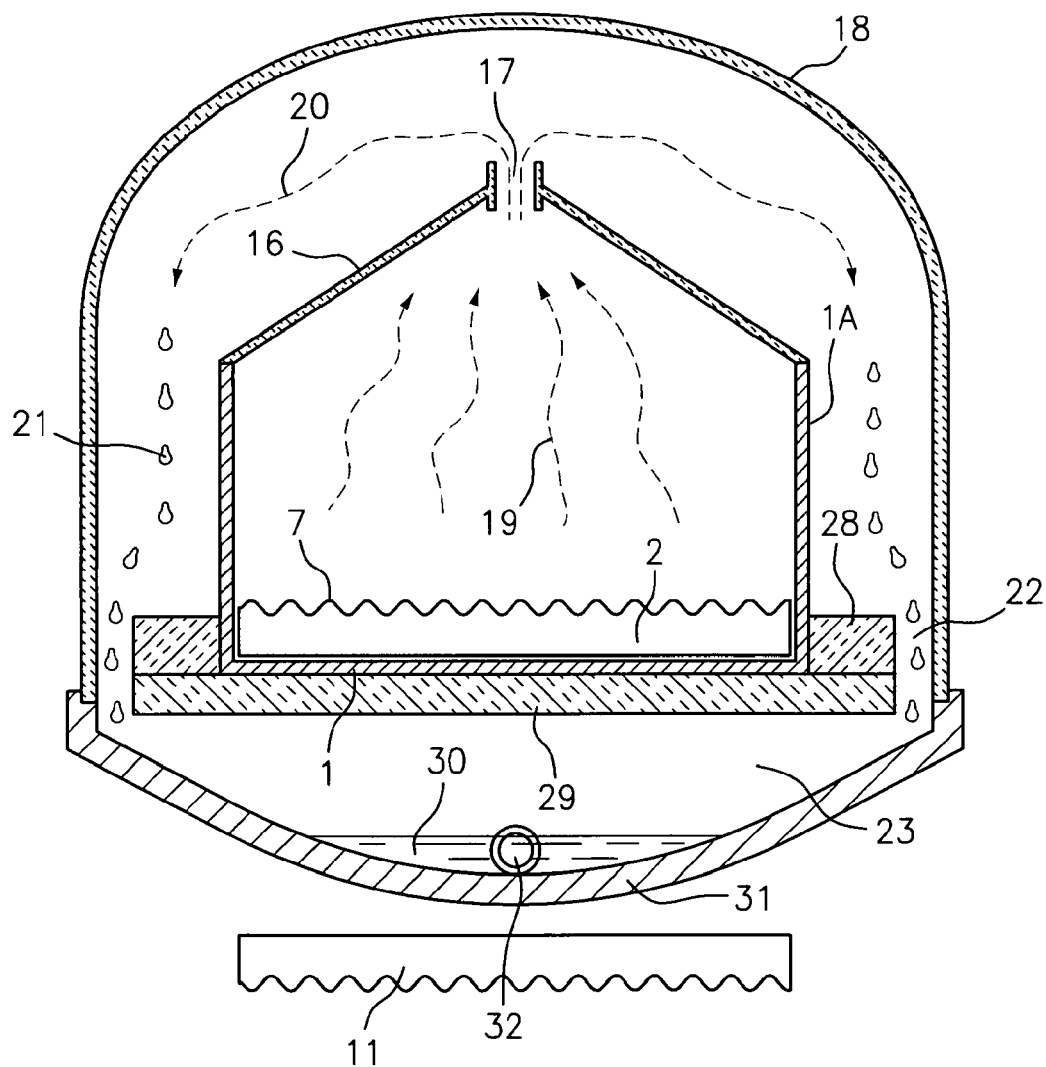
FIG. 1 is a cross-sectional view of the tilted sluiceway which is shown in FIG. 2, taken along line 33 of FIG. 2.
Figure 2:
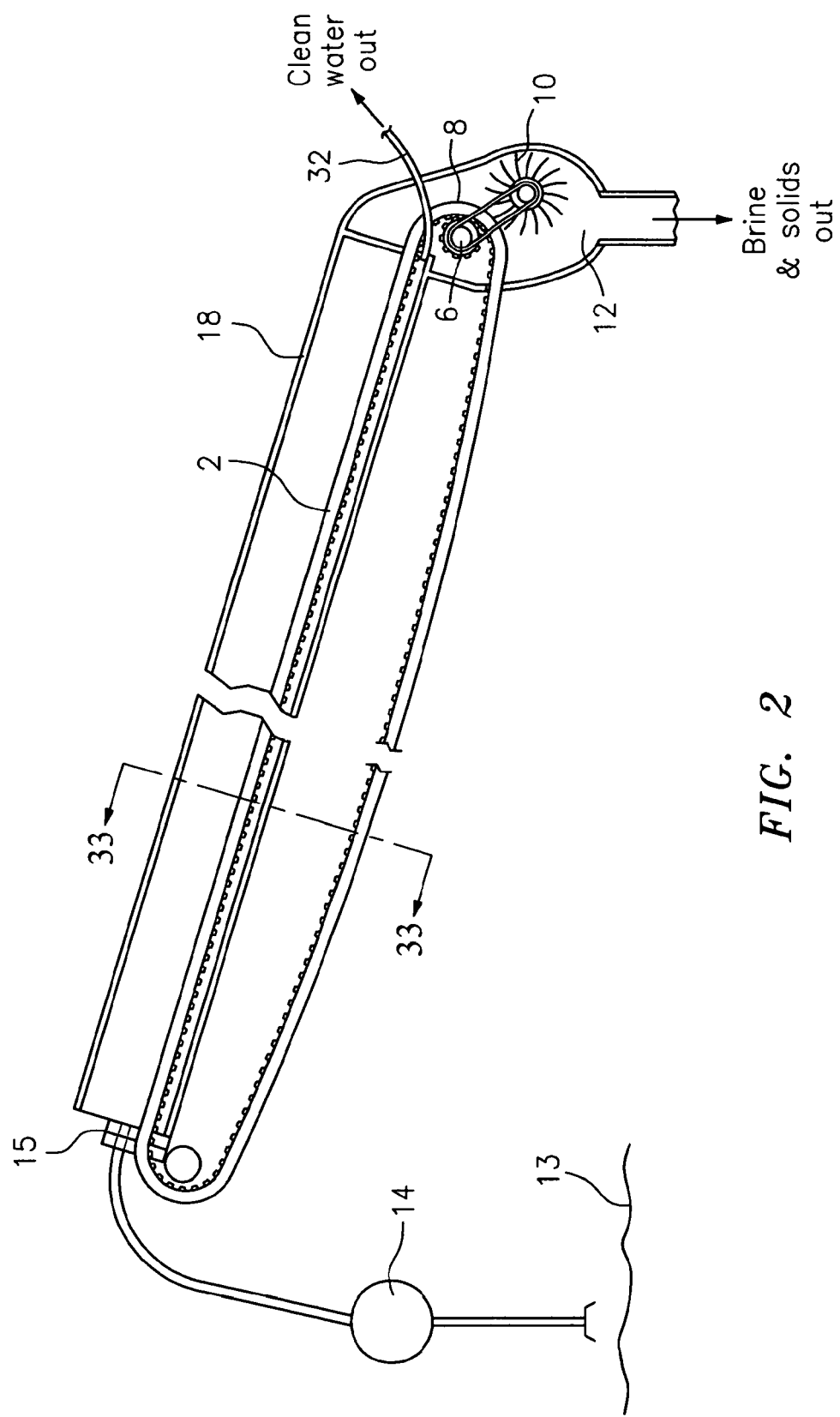
FIG. 2 is a side elevational/plan view of an embodiment of a mechanical means to produce drinking water from polluted or sea water as is shown in the present invention.

The first embodiment of the invention consists of a square or rectangular downward tilted moving flexible sluiceway as shown in FIG. 2, running inside a rigid track 1, smaller (or larger) than six centimeters wide when looked at in FIG. 1 from end-to-end along line 33 in FIG. 2, with the rigid side walls of the rigid track, 1A, smaller or larger than five centimeters high. The measurements used here and throughout the description are for illustration only, and to demonstrate that each individual unit must be smaller rather than larger, primarily to allow for the efficient accumulation of heat from the sun, and for the efficient extraction of the solids or brine (hereafter "solids"). The actual measurements for a functioning unit may vary considerably from those stated here. This downward tilted rigid sluiceway will support and maintain the path of the flat shape and form of the flexible sluice belt 2 running inside it, and will act as a track for the flexible sluice belt to move like a conveyor belt within the confines of the rigid sluiceway track 1, 1A.

The flexible sluice belt 2, enclosed within the rigid sluiceway 1, will be made of rubber or metal or another nonreactive and rigid material, and constructed in lengthwise segments 3 of ten centimeters or more in length, held together by a hinging mechanism 4 from underneath. Also underneath will be a thin and flexible slotted wire or chain 5 running the entire length of the flexible sluice belt, which will be pulled as if on a pulley by a drive shaft 6 connected to a simple electric (or other) motor located separately yet at the lower end of the rigid sluiceway. A single drive shaft may extend some length and the motor thus may impel a whole group of individual sluiceways.

The segments 3 of the flexible sluice belt are either flat or on the concave, and held together rigidly when the belt is moving downward inside the sluiceway, and the space between each segment will be more or less watertight. This resistance to leakage may perhaps be supplemented by small side-to-side ridges and hinges between each segment inside the closure grooves, made of rubber or a similar material which will compress and assure that water will ideally not seep between the segmental grooves. It is not optimal to have water leaking out of the sluiceway during the downward passage of the sluice belt, yet there may be a designed amount of leakage in an inexpensively built unit, perhaps with a simple gutter underneath to redirect the leaking water. Too much leakage of seawater will lead to the need to clean each unit more frequently.

The flexible sluice belt 2 will move at a measured pace along inside the rigid sluiceway from one end of the rigid sluiceway to the other. This flexible belt will also have permanent ridges or riffles 7 projecting a short way upward from the top of the belt, to prevent the water from moving too fast down the sluice and to prevent the solids from being pushed down the belt all at the same time.

When the flexible sluice belt 2 reaches the end of the rigid sluiceway 1 it will collapse so that the segments of the belt will fall open 8 and into a convex shape and go around a toothed wheel 9. There the convexly exposed segments will be scoured by a rotating brush 10 or another similar mechanism, and then be carried upside down 11, below the sluiceway and its associated water collection means, back to the beginning of the rigid sluiceway. During this process of falling open and being brushed and possibly sprayed with non-potable water, almost all of the solids left behind after the evaporation of the sea water or other polluted water will be removed from the flexible sluice belt and thus it will be mostly clear of debris when it goes back around to the beginning of its continuous passage through the rigid sluice way. The solids and brine will fall into a receptacle or a pipe 12 and be carried away back into the ocean using sea water to flush, or be disposed of according to protocol for polluted water effluents. (There may remain a very slow buildup of solids that are not removed in the process of falling open and brushing, which will mean that at extended periods each individual sluiceway may need to be shut down and scoured back to its pristine condition.)

The entire sluiceway FIG. 2 will be tilted at a sufficient angle (usually a small angle of three to five degrees) to allow for the free flow of water by gravity from the top to the bottom of the sluiceway by gravity without any pressure or other propulsion means from the source other than the minimum pressure needed to move the untreated water through the tube and out on to the sluiceway. Untreated sea water or polluted water 13 will thus be pumped 14 (many units can have the same pump) using a minimum pressure through a tube from the source of the untreated water out a hole or holes and liquid spreader 15 at the top of the tilted sluiceway FIG. 2. This water will then flow naturally by gravity, and with some assistance from the moving flexible sluice belt, down the angled sluiceway FIG. 2 at a rate which will be determined by the computed rate of evaporation of water from the local sunlight and climate. The goal will be for all or most of the water to be evaporated and removed 32 by the end of the tilted sluiceway, so that there will come out of the lower part of the end 8, 10, 12 only brine and the solids remaining after the evaporative distillation of the water. Depending on the amount of heat available to evaporate the water, the tilted sluiceway may be anywhere from a few meters in length to twenty or more meters in length. For a particular physical location and climate the length of the tilted sluiceway will be determined by how long it takes to evaporate almost all the water introduced at the top before the end of the tilted sluiceway is reached.

Figure 3:
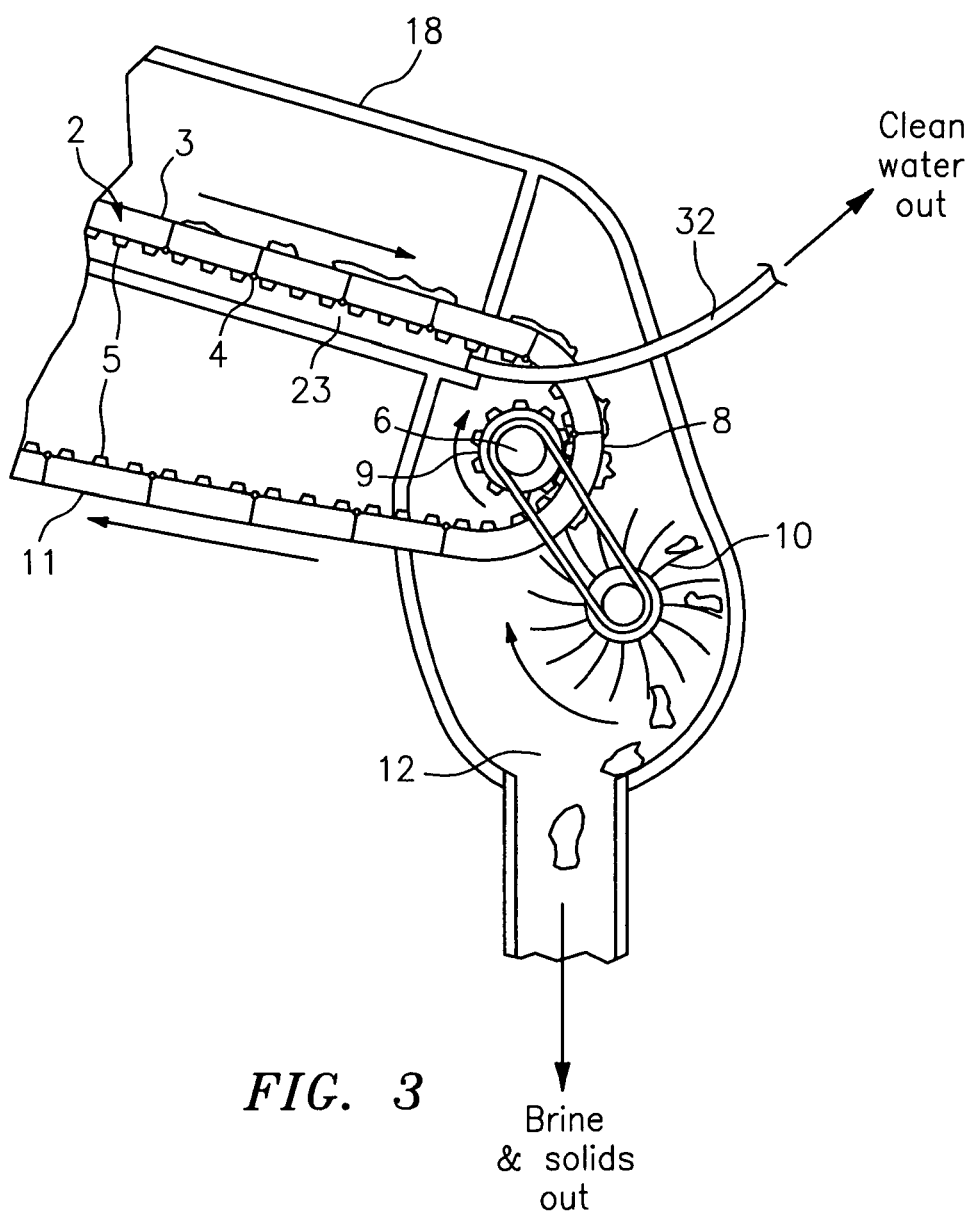
FIG. 3 is a side elevational/plan view of the details of the lower end of the tilted sluiceway and its cleaning and collection means.

The rigid sluiceway 1, 1A is intentionally omitted in FIG. 2 and FIG. 3, so that the mechanism of the flexible sluiceway may be shown. It must be understood that in practice the flexible sluiceway 2 in FIG. 2 and FIG. 3 will be contained inside the rigid sluiceway 1 and as such will not be visible from the side.

The engineering principles of the tilted sluiceway are proven and go back to the nineteenth century. Logging sluices were used in mountainous areas to transport cut timber by water or over ice downhill to a staging area where they could be cut further or loaded onto vehicles. Gold miners used tilted sluices embedded with transverse bars known as riffles to wash water over sand and gravel, where the much heavier gold would be trapped in the riffles while the lighter materials would flow away with the water. Tilted sluices have been used to power waterwheels or electrical generators, and are used as a part of dams as a way to control the release of water over time. While the engineering principles are sound and have been historically useful, none of this prior art is in any way related to the use of tilted sluiceways as described in this invention.

Step Two: The Evaporator

The rigid sluiceway 1, 1A will have set along each of its top edges a continuously running set of panes of glass 16 (or other suitable material not specified), which is tilted inward at an angle on each side of the sluiceway toward the center of the sluiceway, held in place by thin metal or plastic struts (not pictured) crossing the top of the triangular shape. The two tilted glass panels 16 will come together in a triangular manner at the center of the sluiceway 17, yet leaving an open space of perhaps a centimeter more or less where the two glass panels come together 17. The glass or other material must be as clear as possible so as to allow for the nearly unimpeded passage of sunlight through the material and into the sluiceway.

In operation, sunlight and heat collected inside outer dome 18 will penetrate the glass panes 16 and heat up the sea water (or other non-potable water not specified) inside the flexible belt sluiceway 2. The heat will concentrate due to the fully enclosed nature of the outer dome 18, so that the temperature of the flowing sea water will increase to the point where the sea water will begin to evaporate freely. The evaporating airborne steam 19 will push its way upward and exit the sluiceway through the narrow open channel 17 at the top of the glass panels. Due to the narrowness of the opening the evaporated water 20 will almost all remain outside the evaporative channel once it exits the evaporative channel through the narrow open channel 17.

In an alternate embodiment of the tilted sluiceway, there will be no glass panels at the top and the evaporating water will collect and be deflected by the outer glass hood or dome 18.

The areas just surrounding the sluiceway and over and above the angled glass panels will be enclosed with a non-permeable glass (or other suitable material not specified) hood or dome 18 which will be exposed to sunlight. This hood or dome will extend above, around and below the sluiceway and the angled glass panels; leaving an open area above 16 and 17 and between the sluiceway 1, 1A and the top of the hood or dome 18; where the evaporative distilled water 20 will collect as steam. The natural pressure of this steam 20 will force the steam downwards and to the sides of the sluiceway 1, 1A and eventually force the steam downwards and to begin to convert into droplets 21 as it falls. There will be a space on each side of the sluiceway 1, 1A held into place by thin struts (not pictured) holding the sluiceway 1, 1A and the dome 18 into a firmly established position. The somewhat smaller spacing 22 at each side of the hooded glass enclosure 18 drops beside the sluiceway and into the collector 23, described below, which surrounds the area below the sluiceway. The steam or evaporated water which is trapped in the hood will move out and downward as a result of its own momentum, and as a result of additional expansion from the heat inside the hood, and as a result of new steam rising through the narrow open channel at the top of the glass panels and becoming trapped inside the hood.

The non-permeable glass hood 18 must also be as clear as possible so as to allow for the nearly unimpeded passage of sunlight through the material of the hood and through the glass panels 16 and into the sluiceway 1, 1A, 2. The combination of the glass hood 18 and the angled panels 16 will act as an enclosed space where the heat of the sun will increase the ambient temperature not to the boiling point yet to a level where there will be an evaporative or steaming action started. The action will be much like the rise in temperature inside an automobile parked in the hot sun with all the doors and windows closed. The sluiceway 1, 1A, 2 and other associated components need to have a significant length, say, from five meters to twenty meters, due to the fact that the sea water will be heated only to evaporation temperature by the sunlight and thus it will take a period of time moving by gravity slowly down the tilted and riffled sluiceway FIG. 2 for all the sea water to evaporate.

It is well known that water will evaporate even at room temperature. In a refrigerator a covered plastic container with fresh food inside will be observed after a few hours to have significant droplets of clear water hanging onto the inside of the lid, from the evaporation which occurs inside the container. There is thus no need for the water moving down the sluiceway to reach the boiling point or even to reach a higher rather than a lower temperature. The heat of the sun being collected inside the tube will provide sufficient heat to evaporate all the water going down the sluiceway. Mathematical calculations will be needed to match the heat of the sun with the degree of tilt and the amount of water to be pumped onto the sluiceway and the length of the sluiceway in each individual type of location and climate; along with the desired configuration of the sluiceways and the amount of clean water desired as output.

Due to the propensity of water to evaporate, though less vigorously, at low temperatures, it may even be possible to cut back on the water flow and continue to produce clean water for all or part of the night; and also the overall heat generated during the day will take a while to dissipate once the sun goes down.

In colder or very cloudy climates there may be a need to run thin heating wires (not pictured) along the length of the sluiceway, either inside or just below the bottom surface, as the heat of the sun may not be sufficient to raise the temperature of the sea water to the desired evaporation level. This added heating element will increase the cost of the electricity to power the project, yet the overall cost will still be significantly below current costs of running desalination projects. In a very cold climate, or in areas of desert dust storms, there will be some value in covering the installation with a sealed clear plastic dome or roof, which will keep out very cold weather or dust, and at the same time begin the process of heating the air before the sunlight reaches the individual sluiceway domes. In addition, there may be some value in permitting the sea water to run to the head of each sluiceway through long or looped metallic or clear tubes, so that the water temperature is slightly increased by sunlight prior to the water beginning its passage through the sluiceways.

Figure 4:
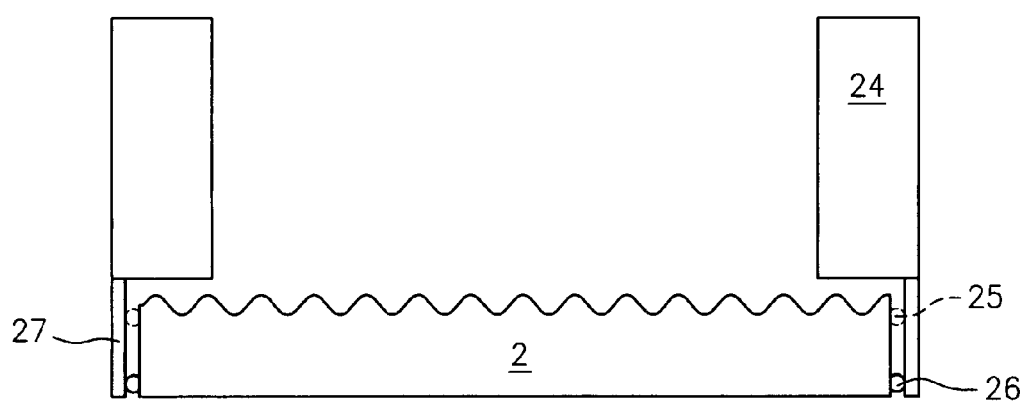
FIG. 4 is a simplified cross-sectional view of the tilted sluiceway which is shown in FIG. 2, also taken along line 33 of FIG. 2, and this view shows the optional fanning blades which may be installed at the inside edges of the tilted sluiceway to speed the movement of the evaporative product.

An optional embodiment is shown in FIG. 4, which is a considerably simplified version of FIG. 1, which is intended to show only the flaps 24 and their relationship with the flexible sluiceway 2. This embodiment includes a long series of separate thin flaps 24 on each side just beside and above the entire length of the flexible belt sluiceway 2. These flaps 24 will be attached at the side of and above the flexible sluiceway 2. The flaps will be impelled to move back and forth (flapping out of the drawing above the plane and back into the drawing below the plane) across the space just above the flexible sluiceway and create a fanning action in the air. The flaps will move only a small distance from one point to another, and the movement of each flap will be in the direction of "from top to bottom of the sluiceway."

In this embodiment the flaps 24 will be moved back and forth by knurled bumps 25 or 26 which will push the axle 27 of the flaps back and forth as the flexible belt 2 moves. The knurled bumps 25, 26 may also impel the flaps 24 to move in one direction and then snap back as if spring-loaded into the other direction when released by the bumps.

The optional embodiment may include along with or as a substitute for the flaps 24 very small low-power fans (not illustrated) which could begin the cooling process and keep the evaporative product moving in the direction below the sluiceway.

The optional embodiment will add complexity to the construction and operation of the whole system; and will add slightly to energy usage, due to the force needed to constantly move the flaps or to power the running of the fans; and extra parts may require a higher degree of regular maintenance and replacement. Nevertheless these flaps or fans may be necessary to create enough movement to stir the evaporative material to rise inside the sluiceway and then fall outside the sluiceway, and should be used where necessary. Due to the overall very small size of the flaps or the fans, not too much extra energy will be required.

Step Three: The Collector

As already described, the areas just surrounding the sluiceway and the angled glass panels will be enclosed with a non-permeable glass (or other suitable material not specified) hood or dome 18. This hood extends above, around and below the sluiceway 1, 1A, 2 and the angled glass panels 16, leaving a surrounding open area of perhaps six centimeters at the top and perhaps two to four centimeters at the side (all distances are indefinite) as the hooded glass 18 drops downward into the spacing 22 beside the sluiceway on each side and down into the area below the sluiceway 23. The hood 18 will be anchored firmly by thin struts (not pictured) at the level of the insulating layer 28. There will be an open space 22 between the hooded glass and the insulated panel 28 throughout the entire length of the sluiceway in FIG. 2, uninterruptedly open except for the struts. As described, the steam or evaporated water which gathers in the hood 18 will move out and downward as a result of its own momentum; and as a result of additional expansion from the heat inside the hood 18 which cannot be relieved by going back into the small slot 17; and as a result of new steam rising through the narrow open channel at the top of the glass panels and becoming trapped inside the hood unable to return back into the small slot 17.

The evaporated water or steam with possible condensation will pass below the level of the bottom floor 1 of the rigid sluiceway, through the narrowed passage 22. (Alternately there could be a metal passage with holes or slots.) Parallel with the bottom floor 1 of the rigid sluiceway and going to the sides and going immediately under the bottom floor 1 of the rigid sluiceway, there will be an insulated layer 29 going all the way from one side of the sluiceway to the other, which will prevent much of the heat generated from above and inside the sluiceway from penetrating to the collection area 23 below the sluiceway. Thus with a significant natural drop in temperature as the steam passes below the level of the sluiceway, the evaporation or steam 20, 21 will condense into purified water 30. This purified water will flow naturally by gravity through a glass (or other suitable material) trough 31 or into a slotted collector pipe 32 and the collector pipe 32 will become an enclosed pipe near the lower end of the run and will direct the purified water into a central collection area, or directly into pipes to pump the water to its location for use, or to another location for further processing.

An alternate embodiment (not shown in the drawings) of the insulating layer 28 will have all the parts shown and in addition a thinner layer of insulation running up the outside wall of each side of the rigid sluiceway 1. This extra layer of insulating material will have a lip or a projection at the top of its upward run so as to begin the cooling of the evaporation or steam 20, 21 before it reaches the level parallel to the bottom panel of the rigid sluiceway 1.

Horizontal Array across Earth or Sand:

The described individual tilted sluiceway with evaporator and collector is a very small and simple device which will produce only a small amount of purified water by itself, perhaps 0.75 cubic meters a day more or less. The intention of the invention is that many thousands or hundreds of thousands of the identical individual devices will be placed in an extended array across earth or sand, or even across water, so that the output of each sluiceway will be combined with the output of all of the other units to produce a very significant amount of purified water at a very low cost per square meter of purified water.

In addition a small horizontal array for family or village use might consist of ten individual units placed side by side. A larger mass production horizontal array might consist of ten thousand or a hundred thousand or even a million individual units placed side by side or in rows. These arrays will be connected by simple metal or plastic frames which will maintain the rigidity of each portion of the array; and will have a connected cover one to the other at a location on the side or near the bottom of each rigid sluiceway 1, 1A which will help keep the collection 23 portion of the array in shadow. Electric or other motors will pump sea water (or other non-potable water not specified) at a low pressure through larger pipes and into smaller tubes such that the water to be treated will arrive at each individual device by an individual tube. The treated water will be collected by a system of smaller pipes underneath the array, connecting along the way to larger pipes which will carry off the treated water to be distributed in a proper manner. The solids will be removed either by conveyor belts or by being dumped into pipes and flushed back into the ocean in a proper manner using sea water or other regulated means to propel and dispose of the solids.

Antenna-Like Array with Small Base:

Each antenna-like array of devices will be suited for the mass production of clean water, though these arrays will by necessity be smaller than a typical mass production horizontal array. The typical configuration will be in the form of a circular concave array dish similar to a radio telescope or a radar antenna. It may be difficult to build a circular concave array dish which is greater than say 90 meters more or less in diameter. Such a circular array could hold 3,000 or more of the individual devices if each device is of a length which goes from the edge of the dish all the way to the center, as may be necessary in a more temperate climate. In a warmer climate it may be possible to use shorter sluiceways and thus have one set of sluices going from the outer circumference half-way to the center circumference of the dish, and a second set of sluices going from the center circumference of the dish to the central core of the dish, for a total of 6,000 or more individual devices. Since each of the individual devices needs to set beside each other device, and each individual device is built in a straight line, there will need to be for example (and not by way of limitation) a hundred devices and then a pie-shaped wedge larger at the outer circumference of the dish and growing smaller towards the center. In any event, circular concave array dishes larger and smaller than 90 meters in diameter are included in the description of this invention.

The array dish will be elevated on a rigid post or posts or pylons designed to conserve the shore of the ocean or to conserve land. The post-mounted elevated array dish may also be rectangular or have another unspecified shape and still may be built to be elevated off the ground to accomplish the intended purpose.

The concave array dish may need to have a flat or domed plastic or glass cover over the whole dish if it is being used at sea or in a location with bad or cold weather. This cover will protect the insides of the dish and also generate the first increase in temperature from the sun from the trapped air inside the dish.

The concave array dish will be mounted on a rigid concrete or metal post which will have a diameter sufficient to have inside it the pumps and pipes and electric or other motors necessary to run the devices and carry away the fresh water. The ideal location for such a dish would be a hundred feet or more offshore in the ocean, and there could be many such arrays in less urban areas without compromising the quality of the seashore or the environment. Such post-mounted dishes may also be used on land, particularly yet not exclusively in mountainous or otherwise irregular geographical areas. The metal or concrete post may support an immovable array, or it may be made with hinges similar to radio telescopes or radar units, where the dish can be moved in a circle or sideways to face more directly towards the sun.

The costs of building each concave array dish may by necessity be greater than that of building a horizontal array, yet the building costs will still be substantially less than building currently available facilities. The operating costs per cubic meter for the desalination or purification of water in such a configuration will not be much greater if at all.

Further Processing of Output:

It is possible that the output of some mass arrays of devices will not meet the water quality standards imposed by the potable water user. In the event that this eventuality occurs, the output water can be further processed using low-pressure methods as for brackish water, or by using the standard methods used by local governments to purify lake water or fresh water containing waste materials or chemical compounds.

I claim:

1. An evaporator and collector assembly for desalination or purification of water, the evaporator and collector assembly comprising:
   a tilted sluiceway comprising a flexible belt disposed within the tilted sluiceway which is angled downward at a predetermined angle from a top of the tilted sluiceway; wherein the water is introduced and flows by gravity down the tilted sluiceway;
   said tilted sluiceway including means for evaporation of said water;
   said flexible belt including a solids and brine disposal outlet;
   a glass triangular roof disposed over said tilted sluiceway, wherein said tilted sluiceway and said glass triangular roof are encircled along an entire length of said tilted sluiceway and said glass triangular roof by a glass tube;

a pump for pumping the water to the top of the tilted sluiceway; and condensing and collection means for the desalinated or purified water.

2. An evaporator and collector assembly for desalination or purification of water, the evaporator and collector assembly comprising:
- a tilted rigid sluiceway having a top end and a bottom end; the water being introduced to the top end and flowing by gravity toward the bottom end; the tilted rigid sluiceway comprising a bottom wall; and side walls;
- a glass roof disposed over the tilted rigid sluiceway; the glass roof having an opening;
- a flexible belt disposed within the tilted rigid sluiceway;
- an outer glass dome; and
- a trough;
- wherein the tilted rigid sluiceway and the glass roof are enclosed by the outer glass dome and the trough; and
- wherein sunlight and heat collected inside the outer glass dome penetrate the glass roof and heat up the water.

3. The evaporator and collector assembly of claim 2 further comprising a collector pipe disposed within a bottom of the trough.

4. The evaporator and collector assembly of claim 3 further comprising a pump to introduce the water to the top end of the tilted rigid sluiceway.

5. The evaporator and collector assembly of claim 2, wherein an insulation layer is directly attached to a bottom surface of the bottom wall of the tilted rigid sluiceway.

6. The evaporator and collector assembly of claim 5, wherein another insulation layer is directly attached to outer surfaces of a lower part of the side walls of the tilted rigid sluiceway.

7. The evaporator and collector assembly of claim 2, wherein the flexible belt comprises a plurality of lengthwise segments held by a plurality of hinging mechanisms; and wherein the plurality of lengthwise segments are of flat or concave shapes.

8. The evaporator and collector assembly of claim 7 further comprising a chain and a drive shaft, wherein the chain is located under the flexible belt and the chain is pulled by the drive shaft.

9. The evaporator and collector assembly of claim 8, wherein the drive shaft drives another chain of another evaporator and collector assembly.

10. The evaporator and collector assembly of claim 7 further comprising a toothed wheel, wherein the plurality of lengthwise segments of the flexible belt open and go around the toothed wheel.

11. The evaporator and collector assembly of claim 10 further comprising a rotating brush configured to scour surfaces of the plurality of lengthwise segments of the flexible belt.

12. The evaporator and collector assembly of claim 11 further comprising a receptacle or a pipe configured to receive solids and brine.

13. The evaporator and collector assembly of claim 2 further comprising a plurality of flaps located above the flexible belt, wherein the flaps move back and forth by a plurality of knurled bumps.

14. The evaporator and collector assembly of claim 2, wherein the flexible belt comprises a plurality of ridges or riffles projecting upward from a top surface of the flexible belt.

* * * * *